March 28, 1967 R. T. MATSUMOTO 3,311,757
DIGITAL PULSE DISTRIBUTION CIRCUIT FOR DIVIDING
THE PERIOD OF A CYCLIC INPUT SIGNAL INTO
PREDETERMINED PLURALITY OF OUTPUTS
Filed Oct. 5, 1964 3 Sheets-Sheet 1

INVENTOR.
RAYMOND T. MATSUMOTO
BY A. M. Fernandez
ATTORNEY

March 28, 1967 R. T. MATSUMOTO 3,311,757

DIGITAL PULSE DISTRIBUTION CIRCUIT FOR DIVIDING THE PERIOD OF A CYCLIC INPUT SIGNAL INTO PREDETERMINED PLURALITY OF OUTPUTS

Filed Oct. 5, 1964 3 Sheets-Sheet 2

INVENTOR.
RAYMOND T. MATSUMOTO

BY A. M. Fernandez

ATTORNEY

March 28, 1967 R. T. MATSUMOTO 3,311,757

DIGITAL PULSE DISTRIBUTION CIRCUIT FOR DIVIDING THE PERIOD OF A CYCLIC INPUT SIGNAL INTO PREDETERMINED PLURALITY OF OUTPUTS

Filed Oct. 5, 1964 3 Sheets-Sheet 3

INVENTOR.
RAYMOND T. MATSUMOTO

BY A. M. Fernandez

ATTORNEY

United States Patent Office 3,311,757

Patented Mar. 28, 1967

3,311,757

DIGITAL PULSE DISTRIBUTION CIRCUIT FOR DIVIDING THE PERIOD OF A CYCLIC INPUT SIGNAL INTO PREDETERMINED PLURALITY OF OUTPUTS

Raymond T. Matsumoto, Cypress, Calif., assignor to North American Aviation, Inc.

Filed Oct. 5, 1964, Ser. No. 401,470
9 Claims. (Cl. 307—88.5)

This invention relates to time base dividing networks and more particularly to automatic time base dividing networks with digital feedback.

In the design of a magnetic disc or drum memory it is desirable to permanently fix the read and write heads to a cover, base or plate. When this is done, the memory becomes less susceptible to vibration than with adjustably fixed heads, and its reliability is thereby increased. The main disadvantage of permanently fixing the read and write heads is that a misplaced head cannot be readily relocated.

To compensate for the lack of any means for physical adjustments in a fixed-head memory, some means for effectively adjusting or shifting a given head electronically is desirable. That may be accomplished by providing means for electronically adjusting the time location of the read head which is that short interval of time spanning the maximum signal output of the read head. By using a clock track as a reference, it is possible to have a circuit which divides the period of the clock into several non-overlapping intervals of time. If one of these intervals of the clock period can be selectively associated with the desired time location of the read head, an electronic means of effectively adjusting the position of a head is provided.

An object of this invention is to provide a time base dividing network whereby the period of a cyclic input signal is automatically divided into $n$ intervals of time.

Another object of this invention is to provide means for automatically dividing a given period of a cyclic input signal into a predetermined number of pulses appearing at a like number of output terminals.

A further object of this invention is to provide means for automatically separating the period of a cyclic input signal into $n$ proportional intervals, each of arbitrary proportion, which intervals are indicated by output pulses at $n$ output terminals.

The foregoing objects of the invention are achieved through a digital time base divider comprising a member of capacitively coupled switching elements in conjunction with a logic network and a D.C. voltage converter for supplying a controlling voltage for the switching elements. An input signal actuates the first switching element which gives rise to a system output pulse the duration of which is approximately $1/n$ of the period of the input signal or any other desired fraction thereof. The first element is returned to its initial state after an interval determined by the RC time constant of its associated input coupling capacitor and its input impedance. The effect of the first element switching back to its initial state causes the second switching element to be actuated thereby producing a second output pulse of a duration determined by the RC time constant of its input coupling network. Each of the remaining switching elements is similarly switched in sequence producing an associated output pulse.

In a preferred embodiment, the total duration of the combined output pulses is selected to be slightly less than the period of the input signal. A slight difference will exist, i.e., the input period will exceed by a small amount the total duration of the output pulses. In accordance with the present invention the total duration of the combined output pulses is made substantially equal to the duration of the input pulse by a logic network which regulates a D.C. voltage converter that supplies voltage to the RC coupling networks of the time dividing circuit. The logic network transmits to the D.C. voltage converter a pulse proportional in duration to the difference between the period of the system input pulse and the total duration of the output pulses. The design of the preferred embodiment of the invention insures that feedback of a given polarity is required after each such pulse to achieve the desired results.

Other objects and advantages of this invention will become apparent from the following description with reference to the accompanying drawing in which.

Figure 1:
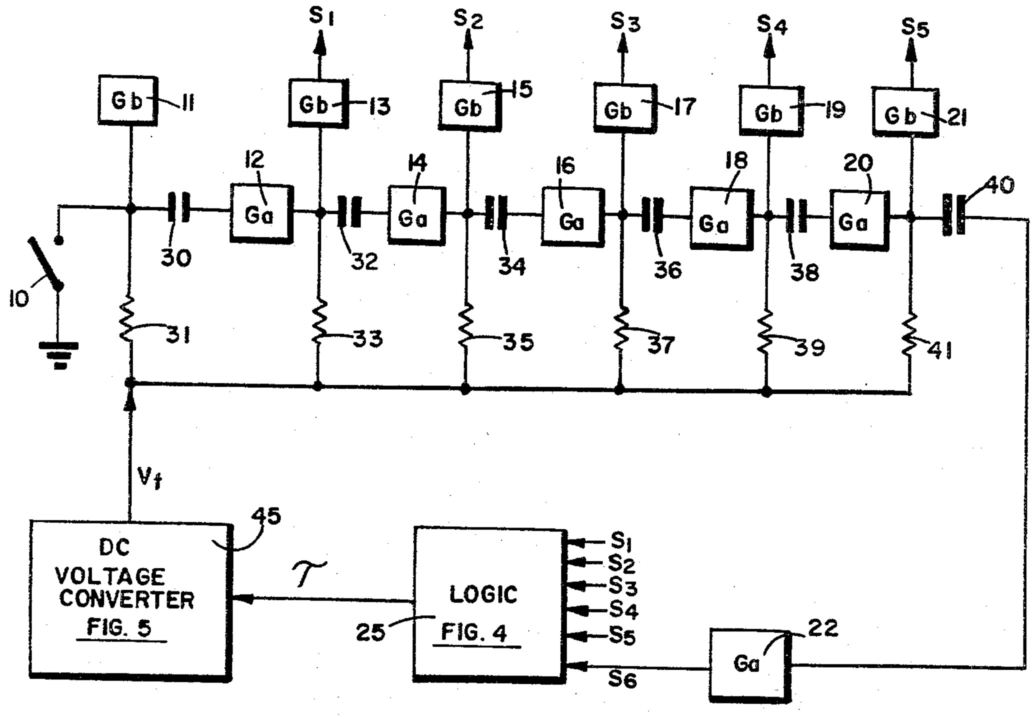
FIG. 1 is a block diagram of the invention.

Referring to FIG. 1, a block diagram of the system is shown with an input switch 10, one terminal of which is grounded. The other terminal is connected to a series of switching elements capacitively coupled in cascade. These switching elements are referred to hereinafter as $G_a$ gates. The output signal of each $G_a$ gate controls an output switching element referred to hereinafter as a $G_b$ gate. Tht output terminals of the $G_a$ gates are normally conducting through an internal connection to ground.

Referring to FIG. 1, a block diagram of the system is shown with an input switch 10, one terminal of which is grounded. The other terminal is connected to a series of switching elements capacitively coupled in cascade. These switching elements are referred to hereinafter as $G_a$ gates. The output signal of each $G_a$ gate controls an output switching element referred to hereinafter as a $G_b$ gate. The output terminals of the $G_a$ gates are normally conducting through an internal connection to ground. A $G_b$ gate 11, or an output circuit of its equivalent impedance is also directly connected to the system input switch 10. The purpose of this $G_b$ gate 11 is to contribute to the impedance encountered by the input signal such that the load impedance of the switch 10 is substantially equal to the load impedance of the first $G_a$ gate 12, which impedance includes the $G_b$ gate 13. The load impedance of the succeeding $G_a$ gates 14, 16, 18 and 20 similarly include the $G_b$ gates 15, 17, 19 and 21, respectively. A $G_a$ gate 22 has its output terminal $S_6$ connected to the system's logic network 25.

It should be noted that the input switch 10 is schematically represented as a mechanical, low impedance switch, but that other switches, such as high speed, low impedance electronic switches, will normally provide the input signal.

With the input switch 10 open, the input terminal of the capacitor 30 of the first stage is charged positively by a potential $V_f$ from a D.C. voltage converter 45 through a resistor 31. When the switch 10 is closed, the junction of the capacitor 30 and the resistor 31 is connected to ground. The output terminal of the capacitor 30 is therefore also effectively shortened to ground since the capacitor 30 acts instantaneously as a short circuit. Accordingly, the capacitor 30 discharges to ground through the input switch 10, the RC time constant of the discharge path comprising the capacitor 30 and the input impedance of the $G_a$ gate 12. The effect of the discharge is to produce a negative voltage excursion at the input of the gate 12. The magnitude of that negative excursion depends upon the RC time constant of the capacitor 30 and the resistor 31, and upon the potential $V_f$, or more specifically upon the potential existing on the input terminal of the capacitor 30 when it is connected to ground. Therefore, if the potential $V_f$ becomes more positive, the negative excursion of the pulse increases in amplitude.

The negative excursion causes the $G_a$ gate 12, which is normally conducting at saturation, to be cut off and become substantially an open circuit. It remains an open circuit for an interval of time determined by the magnitude of the negative excursion at its input terminal and the value of the RC time constant of the capacitor 30 and the input impedance of gate 12. This RC time constant determines the rate of discharge of the capacitor 30 and in turn the time required for the output terminal of capacitor 30 to rise to the positive potential required to cause $G_a$ gate 12 to again conduct at saturation.

Figure 2:
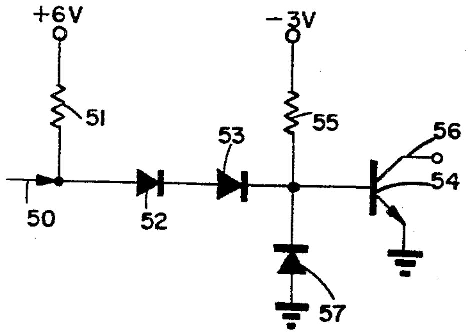
FIGS. 2 to 5 are a circuit diagrams of $G_a$ gates, $G_b$ gates, a logic network, and a voltage converter, respectively, employed in an illustrative embodiment of the invention.
Figure 7:
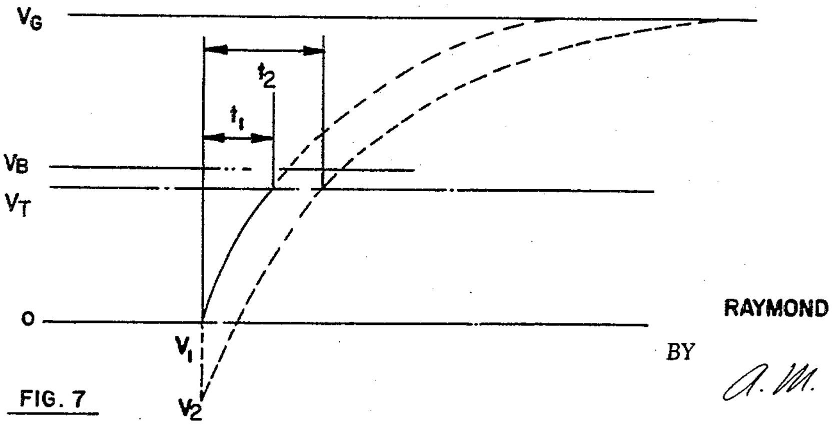
FIG. 7 is a pulse diagram illustrating the RC timing relationship for varying magnitudes of $V_f$.

A potential source connected to $G_a$ gate 12 by a resistor 51 shown in FIG. 2 provides the capacitor with the discharge current. A schematic diagram of the negative voltage excursion at the input terminal of the $G_a$ gate 12 is shown in FIG. 7. When the $G_a$ gate 12 is cut off, its output terminal is raised to the positive potential $V_f$ through the resistor 33, and the capacitor 32 is charged to the positive potential $V_f$. The output of $G_a$ gate 12 is maintained at the positive potential $V_f$ until it is again turned on.

The effect of the output terminal of the $G_a$ gate suddenly being switched from a positive potential $V_f$ to ground is to cause the capacitor 32 to instantaneously produce a negative voltage excursion at the input terminal of $G_a$ gate 14. The amplitude of that negative excursion depends upon the value of the RC timing constant of the capacitor 32 and the input impedance of the $G_a$ gate 14, and upon the potential $V_f$. The same sequence of events ensues in gate 14 as just described in connection with gate 12. The output terminals of all of the remaining $G_a$ gates are similarly switched to a positive potential in sequence as the negative voltage excursion signal is propagated from one gate to the next.

During the interval of time that the $G_a$ gate 12 is cut off, the $G_b$ gate 13 directly connected thereto will switch its normally positive output terminal $S_1$ to ground until the $G_a$ gate 12 again conducts, whereupon the input terminal of the $G_b$ gate 13 is again connected to ground through the conducting $G_a$ gate 12. The result is a negative output pulse at terminal $S_1$. The output terminals $S_2$ through $S_5$ of the other $G_b$ gates 15, 17, 19 and 21 are similarly caused to transmit negative pulses. Those output pulses, along with a controlling output pulse at terminal $S_6$ of the $G_a$ gate 22, are connected to a feedback logic network 25.

Figure 6:
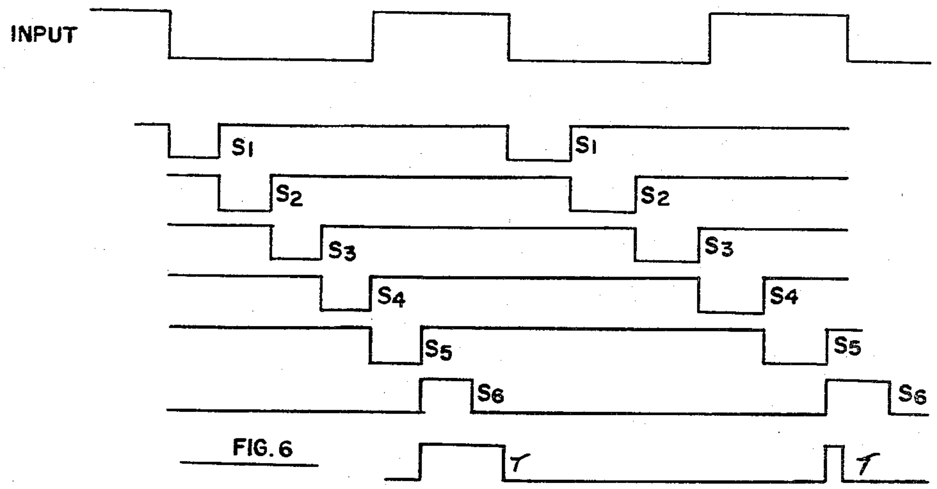
FIG. 6 is a timing diagram showing the time relationship between an input pulse and its division in the form of output pulses.

If the input terminal 10 has not received a succeeding input pulse to be divided when the output signal at terminal $S_6$ of the $G_a$ gate 22 goes positive, the logic network 25 will generate a positive voltage signal T which will continue until a succeeding pulse is received at the input terminal 10. Thus, that positive voltage signal T is present for an interval of time which is proportional to the difference in time between the period of the input pulse and the period of the train of pulses $S_1$ to $S_5$ as shown in FIGURE 6.

The positive signal T is transmitted to the input of a D.C. voltage converter 45, which generates the potential $V_f$. In accordance with this invention, the duration of the signal T determines the amplitude of the potential $V_f$. If the period of the train of pulses $S_1$ to $S_5$ falls considerably short of equaling the period of the input pulse a relatively long signal T will be transmitted by the logic network 25 causing the potential $V_f$ to be increased substantially. A higher potential $V_f$ then causes the period of the next pulse train to increase by expanding each of the pulses $S_1$ to $S_5$ proportionately as illustrated in FIGURE 6.

In a preferred embodiment, the value of the capacitor 30 is selected to be 150 picofarads ±10% and that of the resistor 31 to be 2,400 ohms ±5%. In each of the succeeding stages the value of coupling capacitors 32, 42, 36, 38 and 40 is substantially the same as that of capacitor 30, while the value of resistors 33, 35, 37, 39 and 41 is substantially the same as that of the resistor 31 since the pulses $S_1$ to $S_5$ are to be substantially equal in duration. However, if the pulses are to be of different durations, but always in proportion to each other, different values may be selected for the capacitors and resistors associated with the different $G_a$ gates.

FIGURE 2 shows the circuit diagram of each of the $G_a$ gates in an illustrative embodiment of the system. An input terminal 50 is adapted to be connected to the output of a coupling capacitor, such as capacitor 30 of FIGURE 1. The positive bias (+6 volts) acting through the resistor 51 and diodes 52 and 53 maintains the base-emitter junction of a transistor 54 forward biased in cooperation with a negative bias (−3 volts) coupled thereto by a resistor 55. While forward biased, current in the base-emitter junction of the transistor 54 will cause current to be conducted through its collector to ground thus clamping the collector connected to the output terminal 56 at substantially zero potential. A diode 57 is connected with its cathode to the base of the transistor 54 and its anode to ground to limit the base cut off bias potential to approximately −0.75 volt when a negative excursion signal is present at the input terminal 50.

When a negative signal is present at the input terminal 50, the diodes are reverse biased, thereby allowing the base of the transistor 54 to be biased at approximately −0.75 volt, and causing the transistor to be cut off. The output terminal 56 then assumes the positive potential $V_f$ of its associated RC changing circuit in FIGURE 1. The transistor 54 remains cut off for an interval of time determined by the amplitude of the negative input signal and RC time constant of the coupling capacitor connected to the input terminal 50 and the input impedance of the $G_a$ gate, as described in conjunction with FIGURE 1, which is in practice, the impedance of the resistor 51. In the illustrated embodiment of the invention, the resistor 51 is selected to have a resistance of 6.2K ohms ±5%.

Figure 3:
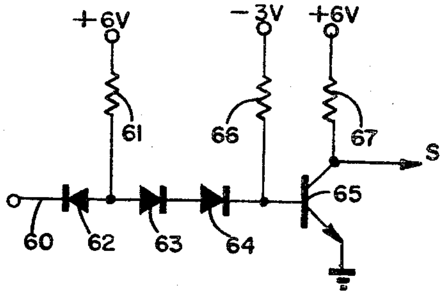

FIGURE 3 shows the circuit diagram of each of the $G_b$ gates used in the system of FIGURE 1. The input terminal 60 is adapted to be connected directly to the output terminal 56 of a $G_a$ gate. The positive bias voltage (+6 volts) connected to a resistor 61 therefore conducts through a forward bias diode 62 to ground when the $G_a$ gate connected to the input terminal 60 is switched on such that its transistor 54 conducts. A pair of diodes 63 and 64, together with a resistor 66 and a negative bias voltage (−3 volts) provide a negative potential at the base of a transistor when the input terminal 60 is at zero volts to cut the transistor 65 off and provide a positive output signal at an output terminal S coupled to a source of positive potential (+6 volts) by a resistor 67. When the transistor 54 in the $G_a$ gate connected to the input terminal 60 is cut off, the diode 62 no longer clamps the diode 63 to ground, and the base of the transistor 65 becomes biased at a potential sufficiently positive to cause it to conduct.

Although particular circuit designs for the $G_a$ and $G_b$ gates have been described, other equivalent circuits may be employed to perform the same function.

In practice, the period of the input signal to be divided is known within reasonable limits. By an appropriate choice of resistor and capacitor values in FIGURES 1, 2 and 3, provision may be made for the period of the pulse train to always be expanded to divide the period of the input pulse. When that is done, a rather simple logic network is all that is required to control the amount by which the pulse train should be expanded to completely divide the period of the input signal into a train of a predetermined number of proportional pulses.

Figure 4:
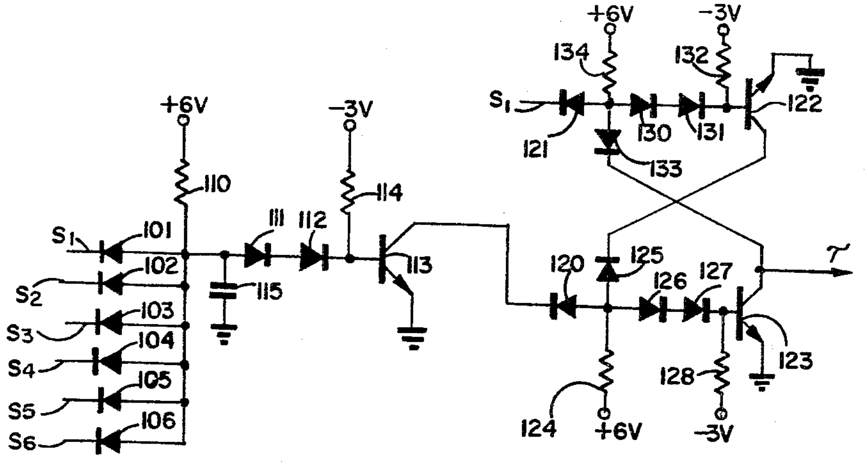

The circuit diagram of the logic network 25 is shown in FIGURE 4. The input terminals of the logic network are connected to the output terminals $S_1$ to $S_6$ as shown in FIGURE 1. Since the terminal $S_6$ is normally at ground potential, its associated coupling diode 106 will normally conduct due to the positive potential source connected to a bias resistor 110. Under those conditions, diodes 111 and 112 are reverse biased thereby permitting a negative potential source connected to a bias resistor 114 to cut a transistor 113 off.

As long as a pulse train is present, one of the other coupling diodes 101 through 105 is forward biased to maintain the transistor 113 cut off even when the diode 106 becomes reverse biased by a positive pulse at the terminal $S_6$. A small memory capacitor 115 is provided to ensure that the transition of the condition of a pulse present on one input terminal to another is not interpreted as a condition of no pulse being present at any terminal. That assures that the system of FIGURE 1 will generate only one pulse train per input pulse.

The output terminal of the transistor 113 is coupled to one input terminal of a flip-flop by a diode 120. The other input terminal is coupled to the output terminal $S_1$ by a diode 121. Normally one transistor 122 of the flip-flop is non-conducting and another transistor 123 is conducting to ground. Since the conduction of current from a positive bias source connected to a resistor 124 is cut off through both diodes 120 and 125 due to the non-conducting state of transistors 113 and 122, the diodes 126 and 127 will conduct and maintain the transistor 123 conducting at saturation. The logic output terminal T is connected to the collector of transistor 123 and is therefore at substantially ground potential.

If a pulse train concludes with an output pulse at terminal $S_5$ and is not immediately followed by an output pulse at terminal $S_1$ from the next pulse train, an output pulse at terminal $S_6$ will cause the transistor 113 to conduct. Conduction of current from the positive bias source then flows through the resistor 124 and the diode 120 to ground thereby reverse biasing diodes 126 and 127 so that a negative bias source connected to a resistor 128 will then reverse bias the transistor 123 cutting it off and switching the transistor 122 on.

The transistor 123 will remain cut off until the next negative pulse at the terminal $S_1$ which will simultaneously switch off the transistors 113 and 122. A diode 133 will then conduct from a positive bias source connected to a resistor 134 to ground through the transistor 123 to maintain the transistor 122 cut off by reverse biasing diodes 130 and 131. In that manner, the logic network establishes an output signal at terminal T proportional to the interval of time between the conclusion of the output pulse at terminal $S_5$ and the start of the next input pulse signaled by the logic input pulse at the terminal $S_1$.

The output signal at the terminal T is employed to vary the output voltage $V_f$ of the D.C. voltage converter 45 of FIGURE 1 in proportion to its pulse width, which is in turn proportional to the difference between the period to be divided and the period of the group of pulses as shown in FIGURE 6.

Figure 5:
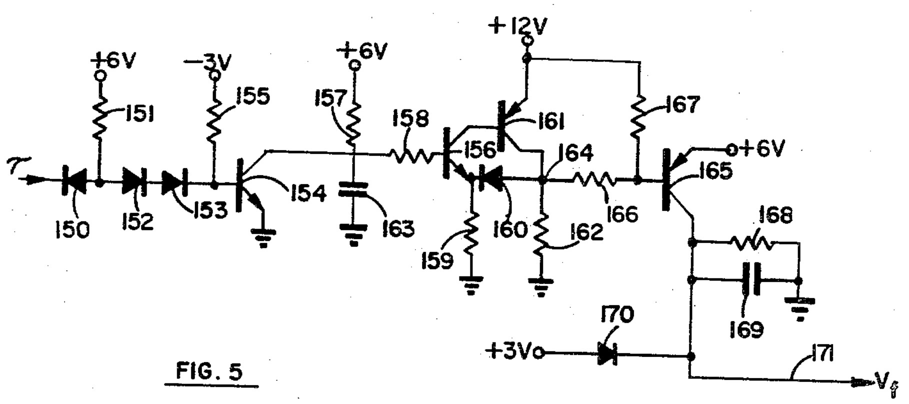

FIGURE 5 shows the circuit of the D.C. voltage converter with its input terminal adapted to be connected to the output terminal T of the logic network of FIGURE 4. When the terminal T is clamped to ground through the conducting transistor 123, a positive bias potential source connected to a resistor 151 will not forward bias diodes 152 and 153 because of the forward biased diode 150. When the transistor 123 is cut off, the diode 150 is no longer forward biased, so that diodes 152 and 153 become forward biased to switch a transistor 154 on. At all other times, the transistor 154 is cut off by a negative bias potential.

The base of a transistor 156 is normally forward biased by a positive bias potential source coupled thereto by a resistor 157 and a resistor 158. The emitter of the transistor 156 is connected to ground by a resistor 159. A transistor 161 has its emitter connected to a source of positive potential and its base directly to the collector of the transistor 156. A diode 160 connects the emitter of the transistor 156 to the collector of the transistor 161 to provide a high impedance amplifier with negligible D.C. offset. A resistor 162 connected to ground provides an output signal at a junction 164. A capacitor 163 is provided to filter transient signals at the base of transistor 156 which may result from switching the transistor 154. The longer the input terminal T remains positive the more negative the base of the transistor 156 becomes due to the discharge of the capacitor 163 through the transistor 154. Consequently, the emitter of transistor 156 tends to go more negative, and the collector more positive, thereby reducing conduction through transistor 161 and driving the junction 164 more negative.

The negative-going signal at the junction 164 is coupled by a resistor 166 to the base of a transistor 165 to cause an increase in the potential at its collector which is connected to a filter comprising a resistor 168 and a capacitor 169.

The voltage $V_f$ appears at an output terminal 171 of the D.C. voltage converter which is connected to the collector of the transistor 165. The voltage is employed in the system shown in FIGURE 1 to so adjust the width of the pulses $S_1$ to $S_5$ that the period of the pulse train approaches the period of the input pulse as shown in FIGURE 6. A diode 170 is connected to the output terminal 171 to limit it to a predetermined minimum positive potential in order to ensure operation when the initial input signal is received.

FIGURE 6 shows two cycles of an input signal produced by the switch 10 in FIGURE 1. For the first cycle, the voltage $V_f$ is either at the minimum established by the diode 170 or relatively low. Consequently, the period of the first cycle is divided into five output pulses $S_1$ to $S_5$ with a large remaining period represented as a pulse T. The pulse $S_6$ is always proportional to the other pulses $S_1$ to $S_5$.

The width of the pulse T resulting in the first cycle will cause a substantial increase in the amplitude of the potential $V_f$ shown in FIGURE 1. An increase in the potential $V_f$ increases the period of each of the pulses $S_1$ to $S_6$ proportionately so that the period of the pulse train will more nearly equal the period of the input signal and the pulse T becomes shorter. The result of a shorter pulse T is a lower potential $V_f$. During subsequent cycles of the input signal an equilibrium is reached where output pulses $S_1$ to $S_5$ nearly equal the period of the input signal and the pulse is minimal due to the feedback in the system of FIGURE 1 provided by the D.C. voltage converter 45.

The signals shown in FIGURE 6 illustrate the output signals from a system in which RC timing circuits were chosen to produce equal output pulses $S_1$ to $S_5$. It should be obvious to one skilled in the art that unequal pulses $S_1$ to $S_5$ could be readily provided by appropriately selecting the time constant for each stage shown in FIGURE 1. That could be effectively accomplished by varying the values of the capacitors 30, 32, 34, 36 and 38. In that manner, a geometric, logarithmic, or other divisional pattern might be devised.

FIIGURE 7 illustrates the waveform of a negative pulse applied to an input terminal of a $G_a$ gate in the system of FIGURE 1. Voltage level $V_B$ represents the potential on the output terminal of a capacitor, such as capacitor 30. When the input terminal of the capacitor is shorted to ground, such as by the switch 10, the potential at its output terminal drops instantaneously on amount $V_1$, which equals the voltage $V_f$ existing on the input terminal just before being grounded. That voltage drop is sufficient to cut off the transistor 54 of the $G_a$ gate. As the capacitor discharges, the potential on the output terminal rises exponentially toward a voltage level $V_G$, which is the positive bias potential of the source connected to the resistor 51 shown in FIGURE 2. When the output terminal of the capacitor reaches a voltage level $V_B$, which is the voltage level required to overcome the negative bias potential $V_t$ of the transistor 54, the $G_a$ gate comprising the transistor 54 conducts. The time $t_1$ represents the time the transistor 54 of the $G_a$ gate is cut off, which is the interval of one output pulse such as an output pulse $S_1$.

A waveform of a more negative pulse applied to a gate $G_a$ is shown by dotted lines in FIGURE 7. The greater voltage drop $V_2$, is the result of a greater voltage $V_f$ on the input terminal of the capacitor. The effect is to cut off the transistor 54 of the following $G_a$ gate for a longer period $t_2$, and therefore to increase the period of the output pulse such as the output pulse $S_1$. Since any increase or decrease of the voltage $V_f$ is applied to all $G_a$ gates in parallel the period of such of the output pulses $S_1$ to $S_6$ is increased or decreased proportionately. In that manner, the period of a feedback signal T converted into a voltage $V_f$ is applied to all RC timing circuits to proportionately increase or decrease the output pulses $S_1$ to $S_6$ until the train of pulses $S_1$ to $S_5$ approximately equals the period of the input signal from the switch 10 as illustrated by the timing diagrams of FIGURES 6 and 7.

While the principles of the invention have now been made clear in the illustrative embodiment, there will be immediately obvious to those skilled in the art many modifications in structure, arrangements, proportions, and materials, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. Apparatus for automatically dividing the period of a cyclic input signal into a predetermined number of sequential pulses and maintaining the combined duration of said pulses approximately equal to said period, comprising a source of control voltage, first means connected to receive said input signal for generating said predetermined number of sequential pulses in response to each cycle of said input signal, the period of each of said pulses being proportional to the amplitude of said control voltage applied thereto from said source, second means connected to said first means for receiving said sequential pulses and for generating a control pulse the duration of which is proportional to the difference between the combined periods of said sequential pulses and the period of said cyclic input signal, and third means connected to said second means for receiving said control pulse and for varying in response thereto the amplitude of said control voltage from said source, said variation being in proportion to the duration of said control pulse, whereby the combined periods of said predetermined number of sequential pulses is maintained approximately equal to the period of said cyclic input signal, thereby automatically dividing each cycle of said input signal into a predetermined number of proportional sequential pulse periods.

2. Apparatus for automatically dividing the period of a cyclic input signal into a predetermined number of sequential pulses and maintaining the combined duration of said pulses approximately equal to said period, comprising a plurality pulse generating means connected in cascade for producing output pulses at respective output terminals in sequence, each means being responsive to the termination of a pulse generated by a preceding means except the first which is responsive to the cyclic input signal, a logic means coupled to said output terminals for producing a control pulse the duration of which is proportional to the difference between the period of a given cycle of said input signal and the combined periods of said output pulses generated during said given input signal period, and control means coupled to said logic means for controlling each of said pulse generating means to increase from a predetermined value the period of the pulse generated by an amount proportional to the period of said control pulse.

3. The apparatus of claim 2 wherein each of said pulse generating means comprises an RC timing circuit having a predetermined and independent time constant for discharge of energy stored in a capacitor, and said control means comprises a variable voltage source coupled to the capacitor of each of said RC timing circuits for storing energy therein, said variable voltage source being responsive to said pulse produced by said logic means to increase from a predetermined level the energy stored in said capacitor by an amount proportional to said pulse, whereby the discharge period of said RC timing circuit of each pulse generating means is increased by an amount sufficient to produce a sequence of pulses the combined periods of which are approximately equal to the period of said cyclic input signal.

4. Apparatus for automatically dividing the period of a cyclic input signal into a group of sequential pulses predetermined in number and maintaining the combined duration of said pulses approximately equal to said period, comprising a pair of input terminals adapted to receive said cyclic input signal, a plurality of cascaded pulse generating means equal in number to one more than said number of sequential pulses in a given group, the first of which pulse generating means is connected to said input terminals, whereby a given cycle of said input signal causes said pulse generating means to generate said group of sequential pulses immediately followed by one additional pulse from the last of said cascaded pulse generating means, control means coupled to said pulse generating means for producing a control pulse initiated by said one additional pulse following a given group of pulses and terminated by the first pulse of the next group, a voltage source, voltage regulating means connected to said control means for regulating the amplitude of said voltage source in accordance with the duration of said control pulse, and means coupled to said voltage regulating means for varying the duration of each of said sequential pulses proportional to the amplitude of said voltage source, whereby the combined duration of said group of sequential pulses approximately equals the period of said cyclic input signal.

5. Apparatus for automatically dividing the period of a cyclic input signal into a group of sequential pulses predetermined in number and maintaining the combined duration of said pulses approximately equal to said period, comprising a pair of input terminals adapted to receive said cyclic input signal, a plurality of cascaded pulse generating means equal in number to one more than said number of sequential pulses in a given group, the first of which pulse generating means is connected to said input terminals, whereby a given cycle of said input signal causes said pulse generating means to generate said group of sequential pulses immediately followed by one additional pulse from the last of said cascaded pulse generating means, logic means connected to receive the sequential pulses of said cascaded pulse generating means for generating a control pulse the duration of which is proportional to the difference between the combined periods of said sequential pulses in a given group and the period of said cyclic input signal, a storage capacitor connected in parallel with each of said pulse generating means, switching means responsive to said control pulse for connecting a voltage source in series with said capacitor whereby said capacitor receives an additional charge during each cycle of said input signal in proportion to the duration of said control pulse and continually discharges to said plurality of pulse generating means, and means within each of said pulse generating means for varying the duration of each of said sequential pulses of a given group in proportion to the amplitude of the stored potential in said capacitor.

6. Apparatus for automatically dividing the period of a cyclic input signal into a group of sequential pulses predetermined in number and maintaining the combined duration of said pulses approximately equal to said period, comprising a pair of input terminals adapted to receive said cyclic input signal, a plurality of cascaded pulse generating means equal in number to one more than said number of sequential pulses in a given group, the first of which is connected to said input terminals, whereby a given cycle of said input signal causes said pulse generating means to generate said group of sequential pulses immediately followed by one additional pulse from the last of said cascaded pulse generating means, first means connected to receive the first of said sequential pulses and said one additional pulse of said cascaded pulse generating means for producing a control pulse the duration of which is proportional to the time between said one additional pulse of a given group and the first of the next group generated during the next input signal cycle, a storage capacitor connected in parallel with each of said pulse generating means, and second means responsive to said control pulse for controlling a voltage source connected in series with said capacitor, whereby said capacitor receives an additional charge during each cycle of said input signal in proportion to the duration of said control pulse and continually discharging through said plurality of pulse generating means, and means within each of said pulse generating means for varying the duration of each of said sequential pulses of a given group in proportion to the amplitude of the stored potential in said capacitor.

7. Apparatus for automatically dividing the period of a cyclic input signal into a group of sequential pulses predetermined in number and maintaining the combined duration of said pulses approximately equal to said period, comprising a variable voltage source, a plurality of cascaded pulse generating means equal in number of one more than said number of sequential pulses in a given group, a given pulse generating means including an input terminal, an output terminal, a transistor having its collector connected to said output terminal and its emitter connected to ground, impedance means coupling said input terminal to said variable voltage source, a capacitor for storing a potential produced by said variable voltage source at said input terminal, means connected to the base of said transistor for biasing said transistor off while said capacitor is storing a potential produced by said voltage source as well as while said capacitor is discharged and for switching said transistor back off after it has been switched on upon said input terminal being connected to ground when the stored potential in said capacitor has been discharged through the emitter of said transistor, the RC time constant of the discharge path through the transistor while it is on determining how long said transistor remains conducting once said input terminal is connected to ground, means for connecting said input signal to the input terminal of the first of said cascaded pulse generating means, logic means connected to receive the sequential pulses of said cascaded pulse generating means for generating a control pulse the duration of which is proportional to the difference between the combined periods of said sequential pulses in a given group and the period of said cyclic input signal, and voltage converting means connected to said logic means comprising said variable voltage source responsive to said control pulse for regulating the amplitude of said voltage source thereby varying the potential stored in said capacitor to vary the duration of said sequential pulses such that the combined duration of said predetermined number of pulses of a group approximately equals the period of said cyclic input signal.

8. Apparatus as defined in claim 7 wherein said voltage converting means comprises a storage capacitor, switching means responsive to said control pulse for controlling a primary voltage source in series with said storage capacitor, whereby said storage capacitor receives an additional charge in proportion to the duration of said control pulse and continually discharges to said plurality of pulse generating means.

9. Apparatus for automatically dividing the period of a cyclic input signal into a group of sequential pulses predetermined in number and maintaining the combined duration of said pulses approximately equal to said period, comprising a variable voltage source, a plurality of cascaded pulse generating means equal in number of one more than said number of sequential pulses in a given group, a given pulse generating means including an input terminal, an output terminal, a transistor having its collector connected to said output terminal and its emitter connected to ground, impedance means coupling said input terminal to said variable voltage source, a capacitor for storing a potential produced by said variable voltage source at said input terminal, means connected to the base of said transistor for biasing said transistor off while said capacitor is storing a potential produced by said voltage source as well as while said capacitor is discharged and for switching said transistor back off after it has been switched on upon said input terminal being connected to ground when the stored potential in said capacitor has been discharged through the emitter of said transistor, the RC time constant of the discharge path through the transistor while it is on determining how long said transistor remains conducting once said input terminal is connected to ground, means for connecting said input signal to the input terminal of the first of said cascaded pulse generating means, first means connected to receive a pulse from the first and last of said cascaded group of pulses generating means for producing a control pulse the duration of which is proportional to the time between a pulse from the last pulse generating means following the generation of a given group of pulses and the first pulse of the next group generated by the first pulse generating means during the next input signal cycle, a storage capacitor connected in parallel with each of said pulse generating means, and second switching means responsive to said control pulse for controlling a voltage source in series with said capacitor, whereby said capacitor receives an additional charge during each cycle of said input signal in proportion to the duration of said control pulse and continually dicharges through said plurality of pulse generating means.

References Cited by the Examiner

UNITED STATES PATENTS

| | | | |
|---|---|---|---|
| 2,486,491 | 11/1949 | Meacham | 328—106 |
| 3,115,608 | 12/1963 | Guillon | 328—105 |
| 3,168,700 | 2/1965 | Gesek et al. | 328—63 |
| 3,248,657 | 4/1966 | Turecki | 328—55 |

ARTHUR GAUSS, *Primary Examiner.*

S. D. MILLER, *Assistant Examiner.*